US008423831B2

(12) United States Patent
Jesudoss et al.

(10) Patent No.: US 8,423,831 B2
(45) Date of Patent: Apr. 16, 2013

(54) SYSTEM AND METHOD FOR PERFORMING AUDITING AND CORRECTION

(75) Inventors: Gerard Jesudoss, Bangalore (IN);
Prabhat L. Hedge, Sunnyvale, CA (US); Xhipra Tyagi, Karnataka (IN); Vadiraj Deshpande, Karnataka (IN); Karthick Dharmarajan, Bangalore (IN)

(73) Assignee: Oracle America, Inc., Redwood Shores, CA (US)

( * ) Notice: Subject to any disclaimer, the term of this patent is extended or adjusted under 35 U.S.C. 154(b) by 938 days.

(21) Appl. No.: 11/484,388

(22) Filed: Jul. 11, 2006

(65) Prior Publication Data

US 2008/0016398 A1    Jan. 17, 2008

(51) Int. Cl.
*G06F 11/00*    (2006.01)

(52) U.S. Cl.
USPC ............... 714/37; 714/25; 714/38.1; 714/39; 717/124; 717/168; 717/174

(58) Field of Classification Search ............ 714/37, 714/25, 38.1, 39; 717/147, 124, 174, 168
See application file for complete search history.

(56) References Cited

U.S. PATENT DOCUMENTS

| 5,892,898 | A * | 4/1999 | Fujii et al. ................ 714/57 |
| 6,012,152 | A * | 1/2000 | Douik et al. .............. 714/26 |
| 6,229,540 | B1 * | 5/2001 | Tonelli et al. ............ 715/735 |
| 6,266,811 | B1 * | 7/2001 | Nabahi ..................... 717/174 |
| 6,338,149 | B1 * | 1/2002 | Ciccone et al. .......... 714/38.12 |
| 6,496,875 | B2 * | 12/2002 | Cheng et al. ............. 710/1 |
| 6,530,024 | B1 * | 3/2003 | Proctor ..................... 726/23 |
| 6,725,452 | B1 * | 4/2004 | Te'eni et al. ............. 717/168 |
| 6,918,038 | B1 * | 7/2005 | Smith et al. .............. 726/22 |
| 6,920,631 | B2 * | 7/2005 | Delo ........................ 717/174 |
| 6,938,250 | B2 * | 8/2005 | Cohen et al. ............. 717/178 |
| 7,356,545 | B2 * | 4/2008 | Muralidharan et al. ... 707/103 Y |
| 7,441,021 | B1 * | 10/2008 | Perry ....................... 709/223 |
| 7,454,791 | B1 * | 11/2008 | Godwin .................... 726/25 |
| 7,620,707 | B1 * | 11/2009 | Sutherland et al. ....... 709/223 |
| 7,734,945 | B1 * | 6/2010 | Levidow et al. .......... 714/3 |
| 7,827,547 | B1 * | 11/2010 | Sutherland et al. ....... 717/173 |
| 7,949,662 | B2 * | 5/2011 | Farber et al. ............. 707/747 |
| 8,069,435 | B1 * | 11/2011 | Lai ........................... 717/106 |
| 8,082,541 | B2 * | 12/2011 | Pramanick et al. ....... 717/130 |
| 2001/0051928 | A1 * | 12/2001 | Brody ....................... 705/52 |
| 2002/0026507 | A1 * | 2/2002 | Sears et al. ............... 709/224 |
| 2002/0059280 | A1 * | 5/2002 | Slesinsky .................. 707/100 |
| 2002/0188941 | A1 * | 12/2002 | Cicciarelli et al. ....... 717/175 |
| 2003/0023839 | A1 * | 1/2003 | Burkhardt et al. ........ 713/1 |
| 2003/0046301 | A1 | 3/2003 | Leathers et al. |
| 2003/0061131 | A1 * | 3/2003 | Parkan, Jr. ............... 705/30 |
| 2003/0088684 | A1 * | 5/2003 | Fisher ...................... 709/230 |
| 2003/0120685 | A1 * | 6/2003 | Duncombe et al. ....... 707/200 |
| 2004/0015908 | A1 * | 1/2004 | Giel et al. ................. 717/141 |
| 2004/0123287 | A1 * | 6/2004 | Fox et al. ................. 717/176 |

(Continued)

*Primary Examiner* — Loan L. T. Truong
(74) *Attorney, Agent, or Firm* — Osha Liang LLP

(57) ABSTRACT

A method for auditing and correcting at least one component in a system, involving defining a first audit rule for the at least one component, wherein the first audit rule defines a check to be performed on the at least one component, defining a corrective action associated with the first audit rule, executing the first audit rule for the at least one component and the corrective action associated with the first audit rule, wherein the first audit rule and the corrective action are executed to identify and remove a problem in the system, and performing a system action upon successful execution of the corrective action.

17 Claims, 4 Drawing Sheets

U.S. PATENT DOCUMENTS

| | | | |
|---|---|---|---|
| 2004/0181787 A1* | 9/2004 | Wickham et al. | 717/168 |
| 2004/0187103 A1* | 9/2004 | Wickham et al. | 717/168 |
| 2005/0021713 A1* | 1/2005 | Dugan et al. | 709/223 |
| 2005/0034116 A1* | 2/2005 | Rodriguez et al. | 717/174 |
| 2005/0038764 A1* | 2/2005 | Minsky et al. | 706/47 |
| 2005/0066015 A1* | 3/2005 | Dandekar et al. | 709/220 |
| 2005/0097516 A1* | 5/2005 | Donnelly et al. | 717/124 |
| 2005/0165906 A1* | 7/2005 | Deo et al. | 709/217 |
| 2005/0278785 A1* | 12/2005 | Lieberman | 726/24 |
| 2006/0020936 A1* | 1/2006 | Wyatt | 717/162 |
| 2006/0026463 A1* | 2/2006 | Paliwal et al. | 714/37 |
| 2006/0085750 A1* | 4/2006 | Easton, et al. | 715/708 |
| 2006/0143264 A1* | 6/2006 | Payne et al. | 709/203 |
| 2006/0200656 A1* | 9/2006 | Cardinell et al. | 713/2 |
| 2006/0271568 A1* | 11/2006 | Balkir et al. | 707/100 |
| 2006/0285665 A1* | 12/2006 | Wasserblat et al. | 379/114.14 |
| 2007/0088639 A1* | 4/2007 | LeGro et al. | 705/34 |
| 2007/0214385 A1* | 9/2007 | White et al. | 714/13 |
| 2007/0266038 A1* | 11/2007 | Hegde et al. | 707/101 |
| 2011/0185431 A1* | 7/2011 | Deraison | 726/25 |

* cited by examiner

SYSTEM AND METHOD FOR PERFORMING AUDITING AND CORRECTION

BACKGROUND

Integrated software is a collection of individually developed software components that are assembled and integrated to solve customer problems in a specified domain. Typically, integrated software involves multi-platform software that eliminates the complexities associated with integrating software products to execute on several different platforms. Examples of such integrated software include Java Enterprise System™ (Java ES) and operating systems such as Windows XP®, etc.

To ensure proper functioning of the system as whole, each individual component of the integrated software must be properly installed, configured, and integrated. Installation is the first step that a user experiences before the various components of the integrated software can be used. Generally, the installation process involves copying files to the hard disk of a system (e.g., in a particular directory of the hard disk). In addition, the installation process makes specific system-level modifications to recognize the installation of one or more components, such as modifications to registry entries. For example, when Windows XP® is installed, several files are copied to the system hard disk, and the windows registry is modified to include the names of the files that are copied to the system hard disk.

Successful installation of integrated software heavily depends on the state of the user's system at the time that the installation procedure is being performed. If user's system is in an inconsistent state when installation is being performed, failures in the installation process may occur. Examples of inconsistent system states may include the presence of inconsistent/stale registry entries. Inconsistent registry entries occur when files that are copied to a particular directory are present on the system, but the corresponding entries have been deleted or removed from the system registry. Alternatively, the opposite scenario could also occur, in which entries are present in the system registry, but the actual files are not copied to the system hard disk. In this case, it appears to the registry that these files exist on the system, when the files actually are not copied to the system hard disk. Further, the presence of improper software components can also affect the installation process.

Installation of integrated software typically occurs using installation programs that automatically perform the installation of the integrated software. Installation programs typically check whether sufficient memory (e.g., random access memory, read-only memory) exists in the system for the installation to be performed. An installation failure causes the user to manually clean up the system to bring the system back to a consistent state. Some installation programs that are configured to detect basic inconsistencies with the system state still require the user to correct the inconsistencies before proceeding with installation.

SUMMARY

In general, in one aspect, the invention relates to a method for auditing and correcting at least one component in a system, comprising defining a first audit rule for the at least one component, wherein the first audit rule defines a check to be performed on the at least one component, defining a corrective action associated with the first audit rule, executing the first audit rule for the at least one component and the corrective action associated with the first audit rule, wherein the first audit rule and the corrective action are executed to identify and remove a problem in the system, and performing a system action upon successful execution of the corrective action.

In general, in one aspect, the invention relates to a framework for performing auditing and correction in a system, comprising a rules engine comprising a first audit rule and a first corrective action, wherein the fist audit rule defines a check to be performed on a system component, and wherein the first corrective action is associated with the first audit rule, an auditing and correction engine operatively connected to the rules engine and configured to execute the first audit rule and the first corrective action, and a reporting engine operatively connected to the auditing and correction engine and configured to generate a report comprising the result of the execution of the first audit rule and the first corrective action, wherein the report is used to identify and remove a problem in the system.

In general, in one aspect, the invention relates to a computer usable medium comprising computer readable program code embodied therein for causing a computer system to define a first audit rule for at least one system component, wherein the audit rule defines a check to be performed on the at least one system component, define a corrective action associated with the first audit rule, execute the first audit rule for the at least one system component and the corrective action associated with the first audit rule, wherein the first audit rule and the corrective action are executed to identify and remove a problem in the system, and perform a system action upon successful execution of the corrective action.

Other aspects of the invention will be apparent from the following description and the appended claims.

DETAILED DESCRIPTION

Figure 1:
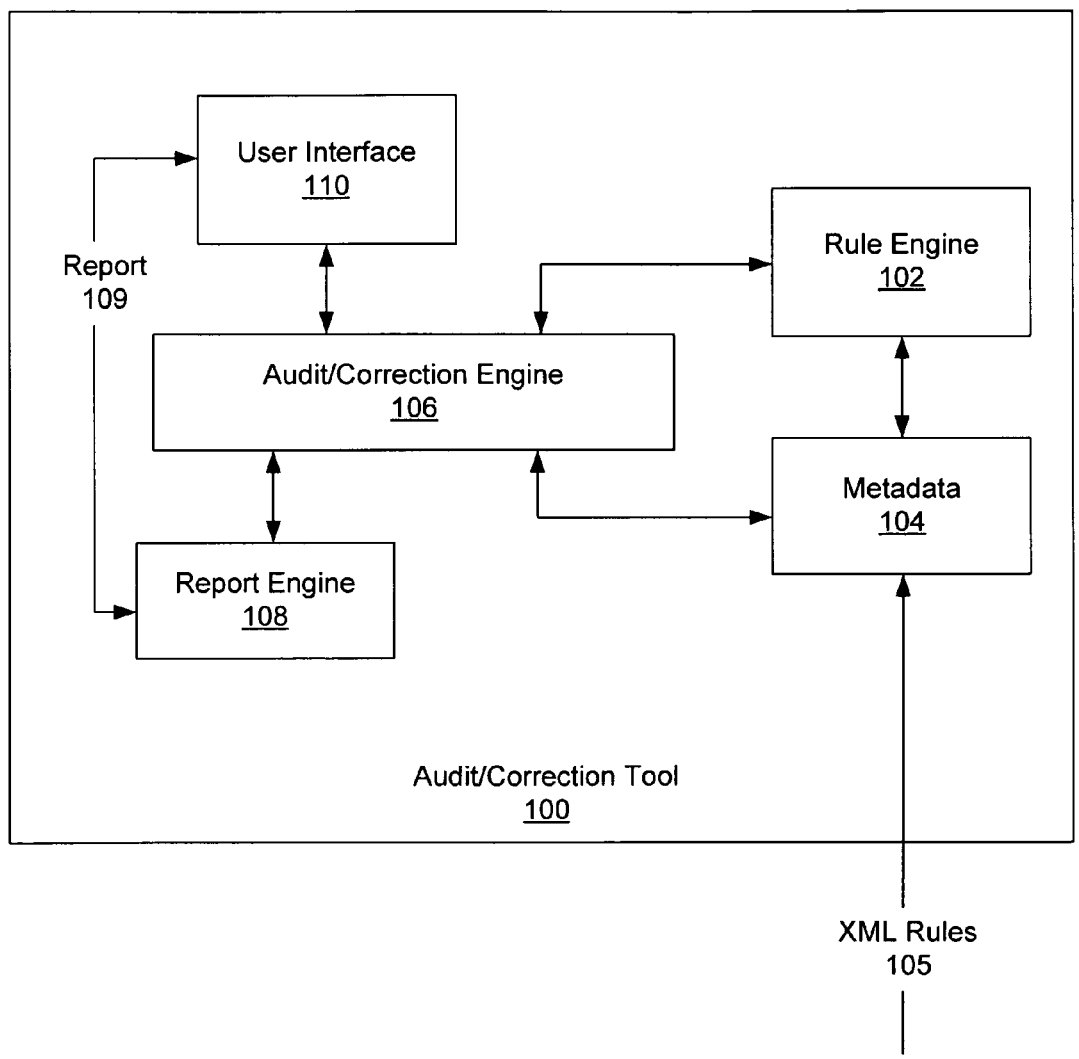
FIG. 1 shows an auditing and correction framework in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to a general auditing utility that is used to detect problems with the state of a system. Further, embodiments of the invention are directed toward a framework and a tool for performing auditing and correction of a system prior to installation of integrated software. More specifically, embodiments of the invention relate to providing a mechanism to check a system's readiness for particular actions to be performed on the system, and correct any inconsistencies automatically.

FIG. 1 shows a framework for auditing and correction of a system in accordance with one embodiment of the invention. Specifically, FIG. 1 shows an audit/correction framework (100) that includes a rules engine (102), metadata (104), an audit/correction engine (106), a report engine (108), and a user interface (110). Each of the aforementioned components of the audit/correction framework (100) are described below.

The audit/correction framework (100) is a general auditing utility that may be used on any system to bring the system to a state in which a system action can be performed without any foreseeable problems. For example, in one embodiment of the invention, a system action may be installation of integrated software. In this case, the audit/correction framework (100) may be used to bring the system to an 'install-ready' state, such that inconsistencies between system components are resolved before installation of the integrated software takes place. In one embodiment of the invention, the audit/correction framework (100) is a multi-platform auditing framework into which platform-specific tasks are pluggable. The audit/correction framework (100) is also independent of underlying system components, such as install builder technologies. Said another way, the audit/correction framework defines a general pattern for a problem detection and correction activities on a system.

Those skilled in the art will appreciate that the audit/correction framework can be used as the bare bones mechanism for any system check that a user defines. That is, the audit/correction framework is a framework into which any user-definable audit/correction function can be plugged-in. Those skilled in the art will further appreciate that installation of integrated software is one example of a system action that may be performed after using the audit/correction framework and is not meant to limit the system action to installation of software. For example, a system action may be configuration of software, monitoring of the capacity of a subdirectory or a portion of memory, or any other system action for which a check can be performed prior to performing the system action.

Continuing with FIG. 1, in one embodiment of the invention, the process of auditing/correcting system components is based on rules. That is, each detectable problem and corrective action that is associated with a detected problem is realized as a rule. Each rule is associated with a rule name and an execution entity (i.e., code) that is executed when the rule is performed. A rule may be a method, a script, etc. specified in any software language. For example, the method INSTALL_UNIT_INTEGRITY_CHECK may be rule that checks for the correctness of install units (i.e., where install units refers to a Solaris package to be installed on a Solaris system). Other examples of audit rules may include periodic virus checking for a system, a check that notifies a user when a particular directory, sub-directory, or area of memory is full, etc. Audit rules may return a Boolean (i.e., true/false) result of the check performed, specific text in response to a query posed, or any other type of specific result based on the execution of the audit rule. In one embodiment of the invention, the rules engine (102) of the audit/correction framework (100) is configured to define an interface for the rules that specify an auditing function. The rules engine (102) allows a user to list the rules and corresponding corrective actions to be executed when a rule is executed. Rules that are defined for auditing functions are specified through metadata (104) in Extensible Markup Language (XML) (i.e., XML Rules (105)). Thus, in one embodiment of the invention, the audit/correction framework takes XML rules (105) as input.

Those skilled in the art will appreciate that the rules-based approach used to define system checks and corrective actions in the present invention allows the framework to remain flexible and customizable. Said another way, the framework does not hard-code any of the system checks. Rather, users are able to update, modify, and specify rules as input into the framework for different types of system checks and corrective actions that are to be performed on the system In one or more embodiments of the invention, the rules engine (102) is operatively connected to metadata (104) so that the rules engine (102) can access the rules specified in metadata (104). In one embodiment of the invention, using the interface definitions provided by the rules engine (102), specifying XML rules (105) as metadata (104) enables: (1) the ability to define components that need auditing/correction; (2) the ability to define one or more audit rules for each component; (3) the ability to associated a corrective action for each audit rule; and (4) the ability to specify an error or warning message for each audit rule. The metadata (104) provides a mechanism for a user to specify/add a rule in XML such that the framework is able to recognize and execute the rule. In addition to specifying the rule, the user also specifies the code (i.e., the method and/or function) that is executed to perform the system check realized as a rule using metadata (104).

In addition, the rules engine (102) is operatively connected to the audit/correction engine (106). In one embodiment of the invention, the audit/correction engine (106) is a Java™ class that implements audit/correction rules. The audit/correction engine (106) is responsible for executing the rules defined by the rules engine (102) and specified in metadata (104). Specifically, in one embodiment of the invention, each audit/correction rule is associated with an executable entity, such as a Java™ method. The audit/correction engine (106) executes audit/correction rules by executing one or more Java™ methods associated with the audit/correction rules.

The audit/correction engine (106) is operatively connected to the report engine (108). The report engine (108) is configured to report the list of detected problems after an audit has been performed. In one embodiment of the invention, the report engine (108) generates a report (109) showing the system state and the result of all audits performed by the audit/correction engine (106). Further, in one embodiment of the invention, the report engine (108) generates a list of errors/warnings for each component based on auditing results and metadata. Those skilled in the art will appreciate that a user may customize the report (109) generated by the report engine. For example, the messages associated with each audit rule that is executed can be customized to present detailed information, severity of the detected problems, sort the results, filter results based on particular information, etc. More specifically, a user can customize the report by specifying information in a report configuration input file that is automatically executed by the reporting engine to display results to a user.

In one embodiment of the invention, in addition to being used as a framework for any type of system, the audit/correction framework (100) can be used as a tool that is manipulated by a user of the system. In this form, the tool is driven by the audit/correction framework (100). More specifically, the tool implements a workflow that steps a user through the process of (i) detection, (ii) reporting, and (iii) correction (described below in FIG. 2).

When used in this manner, the audit/correction tool includes a user interface (110). More specifically, when the framework is used as a tool, information is presented to a user via the user interface (110) in a user-friendly manner. That is, the user interface (110) displays categories of audit checks that can be performed on the system within the user interface (110). For example, categories of audit checks may include, anti-virus scanning, disk space auditing, installation auditing, etc. Further, each category may include one or more rules that relate to that category of audit checks. Using the user interface (110), the user simply selects a particular category of audit checks that the user wishes to perform on the system, and the various rules that are defined under the selected category are executed on the system. Those skilled in the art will appreciate that the user may execute some or all of the rules that fall within a particular selected category of audit checks. Further, those skilled in the art will appreciate that the category under which a particular rule falls is configurable when the rule is written for input into the framework.

In one embodiment of the invention, the user interface (110) includes a graphical user interface (GUI) and a command line interface (CLI) to take input from a user and/or display report results for review by a user. The GUI portion of the user interface (110) may include several windows that display different aspects of the auditing/correction process. For example, the user interface (110) may include a task list window, a component selection window, an audit progress window, a report window, and a corrective action progress window.

In one embodiment of the invention, the task list window displays options for the user to select a default audit check or a custom audit check for various components of the system. The component selection window allows the user to select from different products/components of the system that are to undergo auditing checks. The audit progress window displays the updated progress of an audit being performed. In one embodiment of the invention, the audit progress window is a modal window that provides the user the report generation status at any particular time during the audit process. The report window displays the result of the audit performed. More specifically, the report window provides the detailed status of each of the selected products/component for which an audit was performed. Finally, the corrective action progress window displays the progress of corrective actions being performed.

Figure 2:
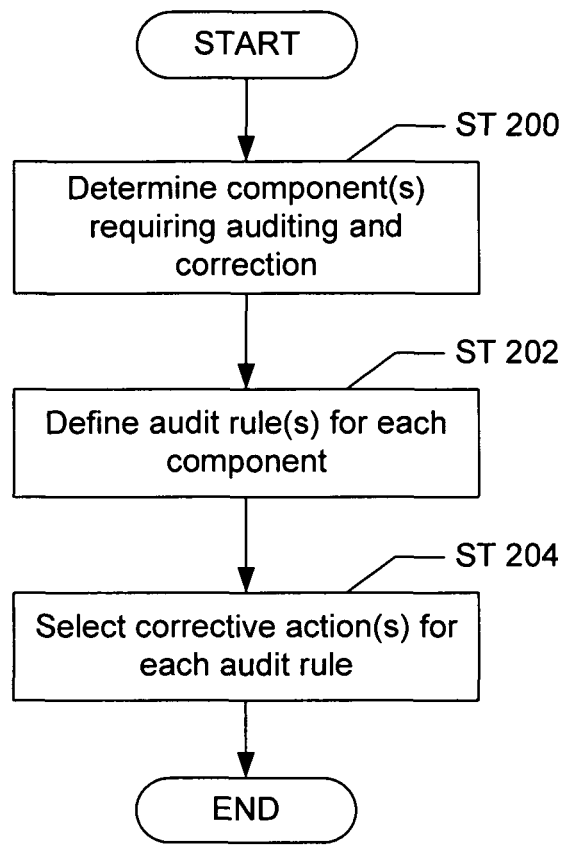
FIG. 2 shows a flow chart for setting up auditing and correction of a system in accordance with one embodiment of the invention.

FIG. 2 shows a flow chart for setting up auditing and correction of a system in accordance with one embodiment of the invention. Initially, the system component(s) that a user wishes to audit/correct are determined (Step 200). As described above, in one embodiment of the invention, the user interface (110) provides an option that enables the user to perform auditing for selective components (i.e., a component selection feature). If the user chooses a custom audit check, then a component selection window is displayed, which gives the user the opportunity to select specific products/components for which auditing checks are to be performed. In one embodiment of the invention, the system component(s) that a user wishes to audit may depend on the type of system action that is to be performed subsequent to performing auditing and correction. For example, if the system action to be performed is installation of integrated software, system components that are audited may include a system registry, install components, etc.

Subsequently, audit rules are defined for each system component that is to be audited and/or corrected (Step 202). In one embodiment of the invention, audit rules are defined in XML and input as metadata into the audit/correction framework. Finally, corrective actions are selected for each defined audit rule (Step 204). Corrective actions are actions that repair the problems that are detected by an audit rule. For example, if an audit rule detects whether a particular portion of memory is full, then a corrective action associated with that audit rule may be to free up that portion of memory, if the memory is found to be partially or completely full. Those skilled in the art will appreciate that more than one corrective action may be selected for one audit rule.

Figure 3:
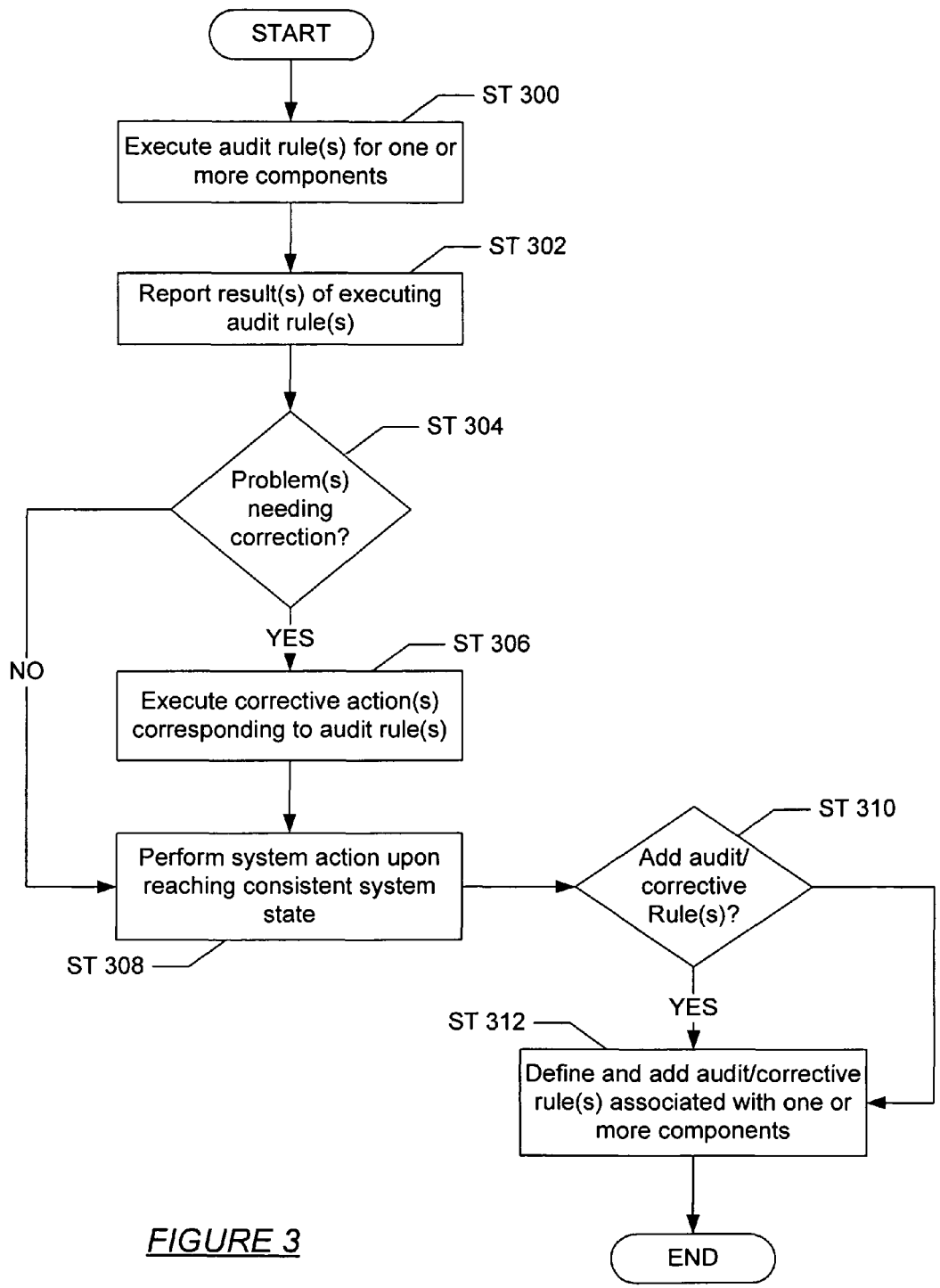
FIG. 3 shows a flow chart for using auditing and correction of a system in accordance with one embodiment of the invention.

FIG. 3 shows a flow chart for using auditing and correction of a system in accordance with one embodiment of the invention. Initially, audit rules are executed for one or more system components (Step 300). In one embodiment of the invention, the results of executed audit rules are stored under different audit states that may be defined by a user. For example, STAL_COMP_IN_REG, MISSING_COMP_IN_REG, FIXED, NO_INSTALL_FOUND, etc., are examples of audit states that may be displayed to a user to indicate problems detected by executed audit rules. Subsequently, the results of the executed audit rules are reported via a user interface (Step 302). More specifically, a default or customized report is displayed via a graphical user interface for viewing by a user. At this stage, a determination is made as to whether the detected problems are to be repaired by associated corrective actions (Step 304). In one embodiment of the invention, the user is provided with an option to automatically correct the problems detected and displayed in the report. That is, if corrective actions associated with audit rules are executed, then repairs are performed on the system automatically.

Thus, if the user wishes to perform corrective actions, then corrective actions associated with the executed audit rules are executed (Step 306). Those skilled in the art will appreciate that a user may manually correct detected problems rather than executing corrective actions associated with audit rules. Regardless of whether corrective actions are performed, a system action is performed when the system is in an appropriate state (Step 308). For example, if the system action involves the installation of integrated software, then the installation of integrated software is performed when the system is in a consistent state for installation (i.e., when the system is in an 'install-ready' state). At this stage, a determination is made as to whether a user wishes to define additional audit rules and/or corrective actions to be performed on system components (Step 310). If the user wishes to define additional audit rules and/or corrective actions associated with one or more components, then the user may specify audit rules/corrective actions as XML metadata input into the audit/correction framework (Step 312). Alternatively, if no further audit rules/corrective actions are to be defined, then the process ends.

As mentioned above, in one embodiment of the invention, the audit/correction framework may be used to perform system installation checks before installation of integrated software. For example, before installing Java™ Enterprise System on a Solaris system, a user may wish to perform auditing and/or correction to ensure that the installation of packages on the Solaris system is free of errors/failures. Before launching the installer, the present invention provides a mechanism to inspect the system and repair problems which may lead to an unsuccessful installation. In one embodiment of the invention, the audit/correction framework performs consistency checks to ensure that all the areas of a system which are modified by an installation/un-installation of software are consistent with each other.

Figure 4:
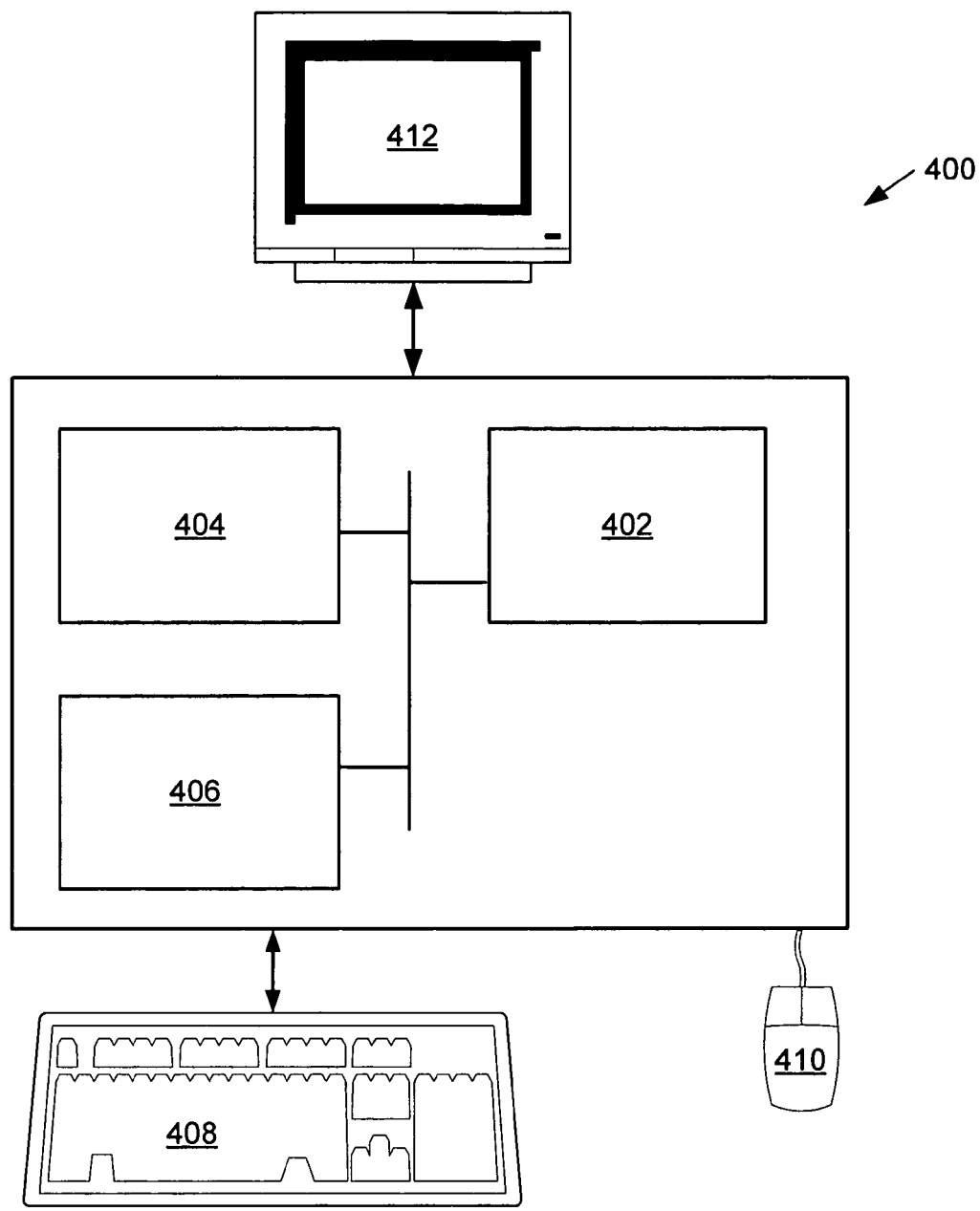
FIG. 4 shows a computer system in accordance with one embodiment of the invention.

The invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer system (400) may also include input means, such as a keyboard (408) and a mouse (410), and output means, such as a monitor (412). The networked computer system (400) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (400) may be located at a remote location and connected to the other elements over a network. Further, the invention may be implemented on a distributed system having a plurality of nodes, where each portion of the invention (e.g., the rules engine, the user interface, the audit/correction engine, etc.) may be located on a different node within the distributed system. In one embodiment of the invention, the node corresponds to a computer system. Alternatively, the node may correspond to a processor with associated physical memory.

Further, software instructions to perform embodiments of the invention may be stored on a computer readable medium such as a compact disc (CD), a diskette, a tape, a file, or any other computer readable storage device.

Embodiments of the invention provide a framework and a tool for identifying problems that could lead to failed system actions before the system actions are performed. Further, embodiments of the invention report the detected problems in a user-friendly manner and repair the detected problems if the user chooses to perform corrective actions on the detected problems. Thus, the present invention provides a flexible, customizable, extensible, and scalable framework for performing a wide variety of system checks before performing any system action that the user chooses to perform. For example, if the system action is installation of integrated software, embodiments of the invention reduce the install failure rates by detecting and automatically correcting inconsistencies in the system before installation takes place.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
  a processor;
  a rules engine configured to define an interface for a plurality of rules each of which specify an auditing function, wherein the rules engine comprises a first audit rule and a first corrective action, wherein the first audit rule defines a check to be performed on a system component and wherein the first audit rule comprises executable code that determines, when executed, an audit state of the system component, and wherein the first corrective action directly corresponds to the first audit rule, wherein the corrective action is configured to repair a problem in the at least one component that is detected by the first audit rule;
  an auditing and correction engine operatively connected to the rules engine and configured to execute the first audit rule and the first corrective action, wherein the auditing and correction engine is implemented as a Java™ class; and
  a reporting engine operatively connected to the auditing and correction engine and configured to generate a report comprising the result of the execution of the first audit rule and the first corrective action,
  wherein the rules engine, the auditing and correction engine, and the reporting engine are executed by the processor associated with the computing system, and
  wherein the auditing and correction comprises removing inconsistent registry entries to bring the system component to an installation-ready state for installation of an integrated software on the system.

2. The system of claim 1, wherein the first audit rule and the first corrective action are specified in an XML file stored in memory.

3. The system of claim 1, wherein the report is customizable by a user.

4. The system of claim 1, further comprising:
  an audit and correction tool comprising a user interface configured to display the report for a user.

5. The system of claim 4, wherein the first audit rule is displayed as part of a category of audit checks selectable by the user.

6. The system of claim 4, wherein the user interface supports a graphical user interface mode and a command line interface mode.

7. A non-transitory computer usable medium comprising computer readable program code embodied therein for causing a computer system to:
  define a first audit rule for at least one system component, wherein the audit rule defines a check to be performed on the at least one system component and wherein the first audit rule comprises executable code that determines, when executed, an audit state of the system component;
  define an interface for the first audit rule;
  define a corrective action directly corresponding to the first audit rule, wherein the corrective action is configured to repair a problem in the at least one component that is detected by the first audit rule;
  execute, by an auditing and correction engine, the first audit rule for the at least one system component and the corrective action associated with the first audit rule, wherein the auditing and correction engine is implemented as a Java™ class; and
  perform installation of an integrated software on the system upon successful execution of the corrective action, wherein the check performed on the at least one system component comprises removing inconsistent registry entries to bring the at least one system component to an install-ready state.

8. The non-transitory computer usable medium of claim 7, the computer readable program code further comprising instructions for:
  selecting from a default audit check and a custom audit check for the at least one component.

9. The non-transitory computer usable medium of claim 8, wherein when a custom audit check is selected, the computer readable program code further comprises instructions for:
  displaying a component selection window in a user interface; and
  selecting at least one specific component from the component selection window for which the custom audit check is performed, wherein the at least one specific component that is selected depends on a type of the system action that is performed subsequent to performing auditing and correction.

10. The non-transitory computer usable medium of claim 7, the computer readable program code further comprising instructions for:
  reporting a result associated with the execution of the first audit rule, wherein the reporting the result comprises displaying the result for a user.

11. The non-transitory computer usable medium of claim 10, wherein reporting the result comprises displaying at least one selected from the group consisting of an error message and a warning message indicating a problem.

12. The non-transitory computer usable medium of claim 7, wherein the first audit rule and the corrective action are executed to ensure successful installation of the integrated software by bringing the system to a consistent state.

13. The non-transitory computer usable medium of claim 7, wherein the first audit rule is configured to identify an inconsistency in the system prior to installation of the integrated software.

14. The non-transitory computer usable medium of claim 13, wherein the inconsistency comprises at least one selected from the group consisting of an inconsistency in the at least one component and an inconsistency in a registry entry associated with the at least one component.

15. The non-transitory computer usable medium of claim 7, the computer readable program code further comprising instructions for:

defining a second audit rule for the at least one component.

16. The non-transitory computer usable medium of claim 7, wherein defining the first audit rule and the corrective action comprises specifying the first audit rule and the corrective action in extensible mark-up language (XML).

17. The non-transitory computer usable medium of claim 7, wherein executing the first audit rule and the corrective action comprises executing a Java method associated with the first audit rule and the corrective action.

* * * * *